(12) United States Patent
Kim et al.

(10) Patent No.: US 6,175,593 B1
(45) Date of Patent: Jan. 16, 2001

(54) METHOD FOR ESTIMATING MOTION VECTOR IN MOVING PICTURE

(75) Inventors: Hyun Mun Kim, Seoul; Jong Beom Ra, Daejeon-si; Byung Cheol Song, Taejeon-si; Young Su Lee, Seoul, all of (KR)

(73) Assignee: LG Electronics Inc., Seoul (KR)

( * ) Notice: Under 35 U.S.C. 154(b), the term of this patent shall be extended for 0 days.

(21) Appl. No.: 09/065,623

(22) Filed: Apr. 24, 1998

(30) Foreign Application Priority Data

Jul. 30, 1997 (KR) .................................................. 97-36229

(51) Int. Cl.$^7$ .................................................... H04N 11/02
(52) U.S. Cl. ...................................... 375/240.17; 348/699
(58) Field of Search ..................................... 348/699, 700, 348/402, 416, 413, 719; 375/240.16, 240.17

(56) References Cited

U.S. PATENT DOCUMENTS 5,486,876 * 1/1996 Lew et al. ............................. 348/719
6,011,870 * 1/2000 Jeng et al. ............................ 348/402

OTHER PUBLICATIONS

Avideh Zakhor, "Iterative Procedures for Reduction of Blocking Effects In Transform Image Coding", IEEE Transactions On Circuits and Systems For Video Technology, vol. 2, No. 1, pp. 91–95 (Mar. 1992).

Yongyi Yang et al., "Regularized Reconstructions to Reduce Blocking Artifacts of Block Discrete Cosine Transform Compressed Images", IEEE Transactions On Circuits and Systems For Video Technology, vol. 3, No. 6, pp. 421–432 (Dec. 1993).

Gary J. Sullivan et al., "Motion Compensation for Video Compression Using control Grid Interpolation", IEEE International Conference, pp. 2713–2716 (1991).

G. de Haan et al., "IC For Motion–Compensation 100Hz TV With Natural–Motion Movie–Mode", IEEE Transactions On Consumer Electronics, vol. 42, pp. 165–174 (Feb. 1996).

Taner Özcelik et al., "Image and Video Compression Algorithms Based on Recovery Techniques Using Mean Field Annealing", Proceedings of the IEEE, vol. 83, No. 2, pp. 304–316, Feb. 1995.

Yasuyuki Nakajima et al., "A PEL Adaptive Reduction of Coding Artifacts for MPEG Video Signals", pp. 928–932, IEEE, 1994.

* cited by examiner

*Primary Examiner*—Chris S. Kelley
*Assistant Examiner*—Allen Wong
(74) *Attorney, Agent, or Firm*—Fleshner & Kim, LLP

(57) ABSTRACT

A method for estimating a motion vector in a moving picture is disclosed, that selectively uses a bilinear interpolation to estimate a motion vector, which reduces a computational complexity. The method includes estimating Y component motions of all macroblocks and determining a coding prediction mode when a motion vector is obtained. Then, blocks for which the coding prediction mode is determined to be INTER mode are searched for halfpels. A vector having a smaller SAD to an 8×8 block in question from motion vectors ($MV^i_{bil}$) obtained by a bilinear interpolation of a 16×16 block motion vector($MV_6$) and motion vectors of blocks around the 16×16 block is selected as an initial motion vector. A local search of the initial motion vectors of the 8×8 blocks in a ±2 search region is made when the initial vectors of the 8×8 block are determined. Then, a ±0.5 halfpel search is again made to obtain final motion vectors. The final motion vectors are used either in predicting a motion in 8×8 block units or in predicting a motion in 16×16 block units.

20 Claims, 8 Drawing Sheets

FIG.1A
background art

| 4 | 5 | 5 | 5 | 5 | 5 | 5 | 4 |
|---|---|---|---|---|---|---|---|
| 5 | 5 | 5 | 5 | 5 | 5 | 5 | 5 |
| 5 | 5 | 6 | 6 | 6 | 6 | 5 | 5 |
| 5 | 5 | 6 | 6 | 6 | 6 | 5 | 5 |
| 5 | 5 | 6 | 6 | 6 | 6 | 5 | 5 |
| 5 | 5 | 6 | 6 | 6 | 6 | 5 | 5 |
| 5 | 5 | 5 | 5 | 5 | 5 | 5 | 5 |
| 4 | 5 | 5 | 5 | 5 | 5 | 5 | 4 |

<Pixel weighted values for H0>

FIG.1B
background art

| 2 | 2 | 2 | 2 | 2 | 2 | 2 | 2 |
|---|---|---|---|---|---|---|---|
| 1 | 1 | 2 | 2 | 2 | 2 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 2 | 2 | 2 | 2 | 1 | 1 |
| 2 | 2 | 2 | 2 | 2 | 2 | 2 | 2 |

<Pixel weighted values for H1>

FIG.1C
background art

| 2 | 1 | 1 | 1 | 1 | 1 | 1 | 2 |
|---|---|---|---|---|---|---|---|
| 2 | 2 | 1 | 1 | 1 | 1 | 2 | 2 |
| 2 | 2 | 1 | 1 | 1 | 1 | 2 | 2 |
| 2 | 2 | 1 | 1 | 1 | 1 | 2 | 2 |
| 2 | 2 | 1 | 1 | 1 | 1 | 2 | 2 |
| 2 | 2 | 1 | 1 | 1 | 1 | 2 | 2 |
| 2 | 2 | 1 | 1 | 1 | 1 | 2 | 2 |
| 2 | 1 | 1 | 1 | 1 | 1 | 1 | 2 |

<Pixel weighted values for H2>

FIG.2A

● : center
○ : pixels in a 16X16 macroblock

FIG.2B
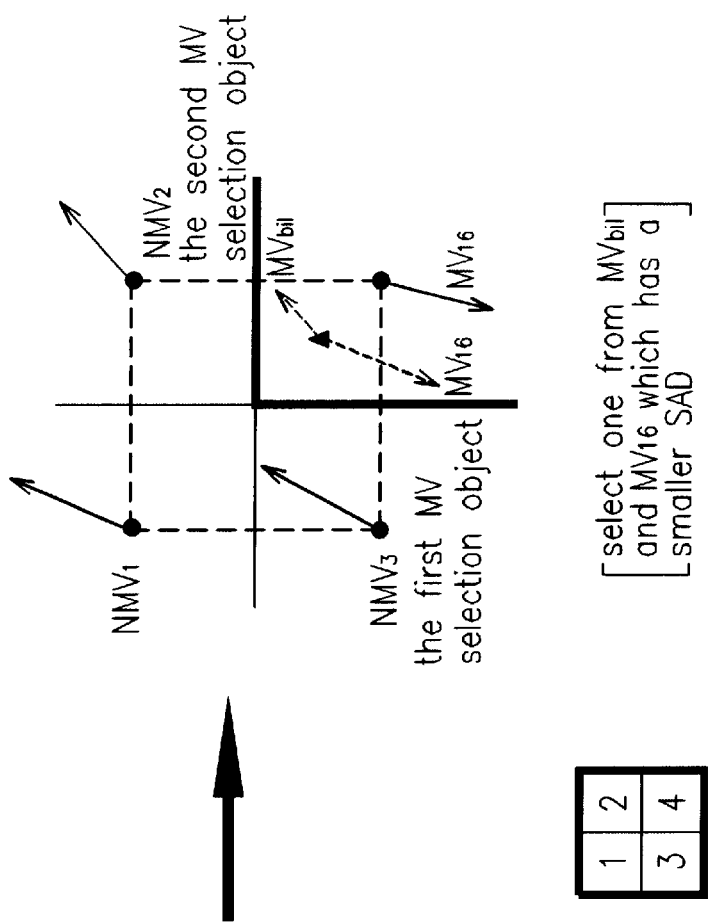
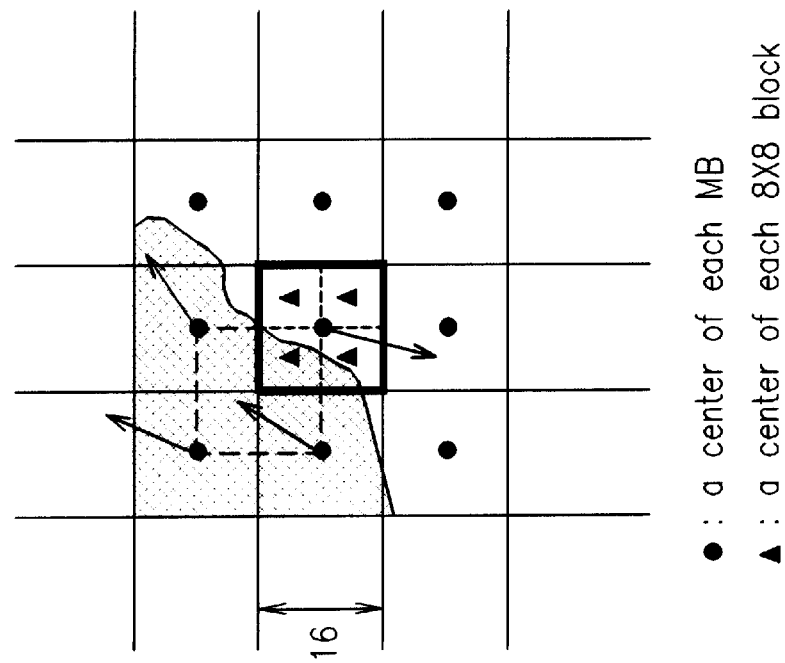

FIG.4A

[A class sequence]

| sequence | resolution | frame rate | quanlization parameter | F_CODE |
|---|---|---|---|---|
| Container Ship | QCIF | 7.5 Hz | 16 | 1 |
| Container Ship | QCIF | 10 Hz | 9 | 1 |
| Hall Monitor | QCIF | 7.5 Hz | 17 | 1 |
| Mother and Daughter | QCIF | 7.5 Hz | 14 | 1 |
| Mother and Daughter | QCIF | 10 Hz | 8 | 1 |

QCIF = Quarter Common Intermediate Formate

FIG.4B

[B class sequence]

| sequence | resolution | frame rate | quanlization parameter | F_CODE |
|---|---|---|---|---|
| Coastguard | QCIF | 10 Hz | 13 | 1 |
| Coastguard | CIF | 15 Hz | 31 | 1 |
| Foreman | QCIF | 10 Hz | 13 | 2 |
| Foreman | CIF | 15 Hz | 31 | 2 |
| News | CIF | 7.5 Hz | 19 | 1 |
| News | CIF | 15 Hz | 11 | 1 |
| Silent Voice | QCIF | 10 Hz | 13 | 1 |

FIG.5A

| sequence (sequence name, format, frame rate) | VM4.0 | | embodiment of the present invention | |
|---|---|---|---|---|
| | PSNR(dB) | No. of bits | PSNR(dB) | No. of bits |
| Container Ship,QCIF,7.5Hz | 29.58 | 102253 | 29.67 | 105705 |
| Hall_monitor,QCIF,7.5Hz | 29.97 | 99024 | 30.08 | 101296 |
| Mother & Daughter,QCIF,7.5Hz | 32.50 | 103763 | 32.58 | 102811 |
| Container Ship,QCIF,10Hz | 33.09 | 263330 | 33.08 | 262243 |
| Mother & Daughter,QCIF,10Hz | 35.15 | 233671 | 35.15 | 233636 |
| Silent voice, QCIF,10Hz | 30.83 | 245347 | 30.83 | 248668 |
| Coastguard,QCIF,10Hz | 29.46 | 506299 | 29.42 | 504584 |
| Foreman,QCIF,10Hz | 30.95 | 452697 | 30.83 | 447310 |
| News,CIF,7.5Hz | 30.97 | 461677 | 31.05 | 468218 |
| Coastguard,QCIF,15Hz | 26.10 | 1114199 | 26.23 | 1187291 |
| Foreman,QCIF,15Hz | 28.27 | 1071640 | 28.56 | 1109205 |
| News,CIF,15Hz | 33.99 | 1149310 | 33.00 | 1146030 |

FIG.5B

| sequence (sequence name, format, frame rate) | VM4.0 with loop filter | | embodiment of the present invention with loop filter | |
|---|---|---|---|---|
| | PSNR(dB) | No. of bits | PSNR(dB) | No. of bits |
| Container Ship,QCIF,7.5Hz | 29.47 | 106684 | 29.57 | 110562 |
| Hall_monitor,QCIF,7.5Hz | 30.10 | 99785 | 30.23 | 101429 |
| Mother & Daughter,QCIF,7.5Hz | 32.64 | 102860 | 32.69 | 102319 |
| Container Ship,QCIF,10Hz | 32.97 | 264534 | 33.00 | 264293 |
| Mother & Daughter,QCIF,10Hz | 35.24 | 232781 | 35.22 | 234110 |
| Silent voice, QCIF,10Hz | 31.09 | 242789 | 31.16 | 245020 |
| Coastguard,QCIF,10Hz | 29.41 | 513488 | 29.40 | 509962 |
| Foreman,QCIF,10Hz | 30.96 | 457022 | 30.94 | 452059 |
| News,CIF,7.5Hz | 31.04 | 462535 | 31.16 | 468965 |
| Coastguard,QCIF,15Hz | 26.07 | 1124808 | 26.24 | 1199566 |
| Foreman,QCIF,15Hz | 28.28 | 1072672 | 28.63 | 1110456 |
| News,CIF,15Hz | 34.01 | 1154367 | 34.07 | 1146655 |

FIG.5C

| sequence (sequence name, format, frame rate) | VM4.0 with post filter | | embodiment of the present invention with post filter | |
|---|---|---|---|---|
| | PSNR(dB) | No. of bits | PSNR(dB) | No. of bits |
| Container Ship,QCIF,7.5Hz | 29.67 | 102253 | 29.74 | 105705 |
| Hall_monitor,QCIF,7.5Hz | 30.14 | 99024 | 30.24 | 101296 |
| Mother & Daughter,QCIF,7.5Hz | 32.62 | 103763 | 32.72 | 102811 |
| Container Ship,QCIF,10Hz | 33.18 | 263330 | 33.17 | 262243 |
| Mother & Daughter,QCIF,10Hz | 35.26 | 233671 | 35.27 | 233636 |
| Silent voice, QCIF,10Hz | 31.07 | 245347 | 31.10 | 248668 |
| Coastguard,QCIF,10Hz | 29.46 | 506299 | 29.43 | 504584 |
| Foreman,QCIF,10Hz | 31.00 | 450697 | 30.93 | 447310 |
| News,CIF,7.5Hz | 31.09 | 461677 | 31.19 | 468218 |
| Coastguard,QCIF,15Hz | 26.09 | 1114199 | 26.24 | 1187291 |
| Foreman,QCIF,15Hz | 28.33 | 1071640 | 28.67 | 1109205 |
| News,CIF,15Hz | 34.12 | 1149310 | 34.14 | 1146030 |

METHOD FOR ESTIMATING MOTION VECTOR IN MOVING PICTURE

BACKGROUND OF THE INVENTION

1. Field of the Invention

The present invention relates to a motion vector estimation, and more particularly, to a method for estimating a motion vector in a moving picture.

2. Background of the Related Art

An outline of an emerging Moving Picture Expert Group (MPEG) standardization, MPEG-4 will now be described. The MPEG-4 pursues a technique different from the techniques of MPEG-1 and MPEG-2 previously used to cope with the current trend in which boundaries of techniques of communication, computer and broadcasting are broken away into multimedia. That is, the object of MPEG-4 is a comprehensive technique that embraces each field of the above techniques and their independent technical innovations independently as well as the exploration of fields to which the new comprehensive technique is applicable. The directions that MPEG-4 pursues at large is a technique that allows an Audio and Video (AV) coding at an extra low bit rate.

To realize the technique that allows an AV coding at an extra low bit rate, the following techniques are suggested. First, a new coding technique in which the MPEG-1 and MPEG-2 DCT transform technique is not used, for example, the Wavelet coding system that has less distortion at block boundaries and a high coding efficiency. Second, a technique that conducts motion compensation in a manner other than the MPEG-1 and MPEG-2 block based motion compensation, which conducts the motion compensation by a macro block unit. Third, a region based coding technique inclusive of the contour coding technique and the object oriented coding technique. Fourth, a Fractal coding technique that can make a compression ratio over 1/1000.

Further, there are 8 new techniques that are not yet realized but are trying to be fully realized in MPEG-4. The eight new techniques include improvement of a coding efficiency, scaleability matching to a content, content handling and bit stream editing, improvement of tolerance for error, access to a multimedia data base, coding of a plurality of synchronous data, hybrid coding of natural data and synthesized data, and improvement of a random accessibility at an extra low bit rate.

A related art method for estimating a motion vector will be explained with reference to FIGS. 1a–1c that illustrate 8×8 block matrices having pixel weighted values according to a related art Overlapped Block Motion Compensation (OBMC).

Additional methods for estimating and compensating a motion vector suggested during the MPEG-4 standardization process include a method for estimating and compensating a motion vector suggested by Sharp, in which a multimode warping prediction is employed and a variable block size motion estimation suggested by Nokia. These methods have excellent characteristics, however, they are computationally complex.

In a current mode of motion vector (MV) estimation method in the MPEG standard, a two stage motion estimation technique is employed. In the two stage motion estimation technique, motion vectors are estimated by a 16×16 macroblock unit. However, for portions of the motion vector with relatively large errors, the motion vectors are estimated by a 8×8 block unit. Further, Overlapped Block Motion Picture (OBMC) is applied as a motion compensation technique to H.263. These motion estimation and compensation techniques are effective in the removal of blocking artifacts that occur in a motion estimation part.

The operational flow of a related art two stage motion estimation and compensation techniques now will be explained. First, in an advanced mode where 16×16 macroblock motion vectors are searched, 8×8 block motion vectors are searched with a search region of ±2.5 pixels in x and y directions with a center of the search on the already searched 16×16 macroblock motion vector. Then, the operational flow proceeds to OBMC, in which, if we assume that a pixel value for a reference frame is p(i,j) and a pixel value for a new frame is $\bar{p}(i,j)$, $$\bar{p}(i,j)=(q(i,j)*H_0(i,j)+r(i,j)*H_1(i,j)+s(i,j)*H_2(i,j)+4)//8$$

where, $$q(i,j)=p(I+MV_x^0, j+MV_y^0),$$
$$r(i,j)=p(I+MV_x^1, j+MV_y^1),$$
$$s(i,j)=p(I+MV_x^2, j+MV_y^2).$$

FIGS. 1a–1c illustrate pixel weighted values in a related art OBMC process, which can inhibit occurrence of the blocking artifacts in the motion estimation part.

The related art method employs the two stage motion estimation technique in which the motion estimation is conducted by a 16×16 macroblock unit, and, then again, by an 8×8 block unit for portions that have a comparatively greater error. Thus, the related art method for estimating a motion vector in a moving picture, which uses the two stage motion estimation technique and the OBMC, has an increased computational complexity and a low efficiency. Accordingly, the related art method causes problems because the method can not deal with MPEG-4 whose object lies on facilitating an AV coding at an extra low bit rate.

The above references are incorporated by reference herein where appropriate for appropriate teachings of additional or alternative details, features and/or technical background.

SUMMARY OF THE INVENTION

An object of the present invention is to provide a method for estimating a motion vector in a moving picture that substantially obviates one or more of the problems caused by limitations and disadvantages in the related art.

Another object of the present invention is to provide a method for estimating a motion vector in a moving picture that uses a decreased bit rate.

A further object of the present invention is to provide a method for estimating a motion picture that selectively uses bilinear interpolation.

To achieve these and other advantages in whole or in part and in accordance with the purpose of the present invention, as embodied and broadly described, the method for estimating a motion vector in a moving picture includes the steps of estimating Y component motions of all macroblocks, determining a coding prediction mode when a motion vector is obtained, searching blocks of which coding prediction mode is determined to be INTER mode for halfpels, selecting a vector having a smaller SAD to an 8×8 block in question from motion vectors $MV^i_{b1}$) obtained by a bilinear interpolation of a 16×16 block motion vector($MV_{16}$) and motion vectors of blocks around the 16×16 block as an initial motion vector, making a local search of the initial motion vectors of the 8×8 blocks in a ±2 search region when the initial vectors of the 8×8 block are determined, and making ±0.5 halfpel search again to obtain final motion vectors, and using the final motion vectors either in predicting a motion in 8×8 block units or in predicting a motion in 16×16 block units.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 1a–1c are diagrams that illustrate 8×8 block matrices having pixel weighted values according to a related art OBMC;

FIG. 2a is a diagram that illustrates a macroblock matrix.

FIG. 2b is a diagram that illustrates estimating a motion vector in accordance with a preferred embodiment of a method for estimating a motion vector according to the present invention;

FIG. 4a and 4b are diagrams that illustrate exemplary conditions for conducting a method for estimating a motion vector in accordance with a preferred embodiment of the present invention; and FIG. 5a–5c are diagrams that illustrate exemplary comparative results of estimating a motion vector in accordance with a preferred embodiment of the present invention.

DETAILED DESCRIPTION OF PREFERRED EMBODIMENTS

Figure 3:
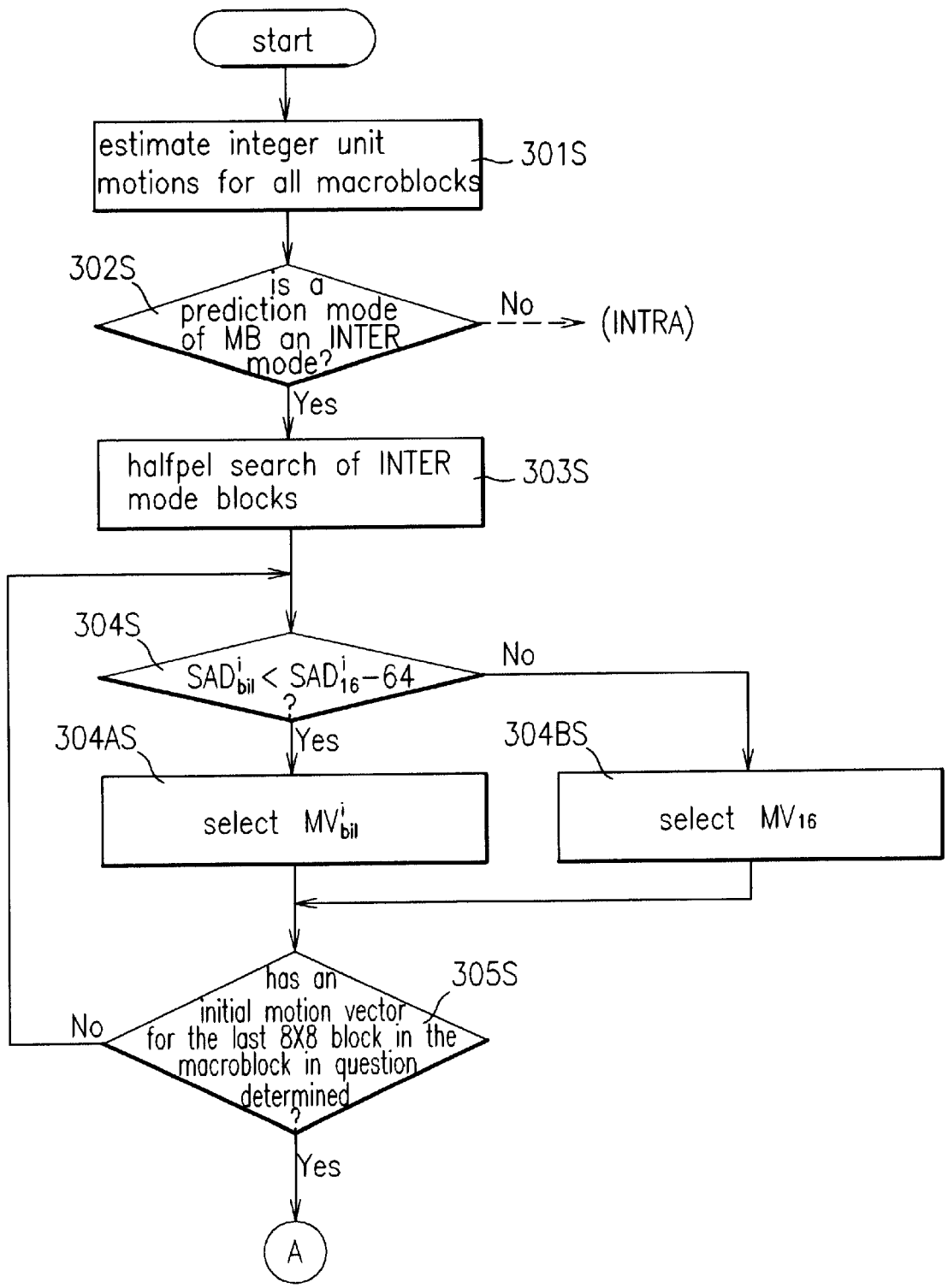
FIG. 3 is a flow chart that illustrates showing exemplary process steps of a method for estimating a motion vector in accordance with a preferred embodiment of the present invention.

A preferred embodiment of a method for estimating a motion vector according to the present invention that uses bilinear interpolation in estimating an 8×8 block motion vector for motion vector estimation, for example, in an advanced mode such as mode H.263 of the MPEG recommendation. In the preferred embodiment, either a motion vector in the macroblock in question, or a motion vector obtained by an bilinear interpolation of a motion vector of the block in question and a motion vector of one of blocks around the block in question is selectively determined to be an initial motion vector.

In the preferred embodiment, the computational requirements are reduced because the bilinear interpolation is conducted for only the motion vector of a center pixel in the 8×8 block, not for all the pixels in the 8×8 block as in the motion estimation and compensation with the multimode warping prediction, Further, when there are many moving objects within the macroblock, the initial motion vector may be more accurate when a motion vector obtained by a bilinear interpolation using one of motion vectors around the macroblock as the initial motion vector, rather than a motion vector in the macroblock as the initial motion vector.

FIG. 2a illustrates an exemplary 16×16 macroblock matrix. FIG. 2b illustrates initial vectors of the 4 8×8 blocks in a 16×16 macroblock being obtained in accordance with the preferred embodiment. Initial motion vectors are taken, not only from motion vectors in a 16×16 macroblock in question, but also from the bilinear interpolated motion vectors if a Summation Absolute Differential (SAD) is smaller. Then, a small region centered on a motion vector of each 8×8 block is searched. For example, in this case the search is conducted in a restored prior Video Object Plane (VOP). If a SAD from the 4 8×8 motion vectors (MVs) is smaller than an SAD from a 16×16 MV, the macroblock is motion compensated in the 8×8 block units, if not, the macroblock is motion compensated in the 16×16 block unit.

The preferred embodiment for estimating a motion vector in a moving picture according to the present invention will now be described with reference to FIG. 3. The first preferred embodiment of a method for estimating motion vectors starts in FIG. 3, where control continues to step 301S. In step 301S, integer unit motions for Y (luminance) components in all macroblocks are estimated. In step 301S, a comparison is preferably made between the present block and the block searched in a prior original VOP for an estimation of a motion. The prior original VOP is preferably padded by a technique suggested in a Verification Model (VM). An entire region search is conducted in the search region according to f_code when an SAD (matching differential) is used as a reference. The f_code is a code denoting an interval of prediction frames. The SAD (matching differential) can be obtained with the following equation.

$$SAD_N(x, y) = \sum_{i=1,j=1}^{N,N} ]MV \text{ of a prior } VOP-$$

$$MV \text{ of the present block}] * (! \text{ (original } VOP = 0))$$

where, $64 \leq x, y \leq 63$, and N=16.

Since there are more (0,0) vectors in an actual image, a value of an $SAD_{16}(0,0)$ is decreased intentionally to a value in accordance with following equation:

$$SAD_{16}(0,0) = SAD_{16}(0,0) - (N_B/2+1),$$

where $N_B$ is a number of pixels contained in a VOP of pixels in a macroblock.

When the integer unit motion vectors in the macroblock in question are obtained in step 301S, control continues to step 302S. In step 302S, a coding prediction mode is determined with the following parameters.

$$\text{Median of a macroblock} = \left( \sum_{i=1,j=1}^{N_B} \text{prior } VOP \right) \bigg/ N_B$$

$$SAD_N(x, y) = \sum_{i=1,j=1}^{16,16} ]a \text{ prior } VOP - \text{median of a macroblock}] *$$

$$(! \text{ (original } VOP = 0))$$

That is, depending on the $SAD_N(x,y)$ and median of the macroblock in question, the coding prediction mode is determined to be an INTRA mode or an INTER mode. When the coding prediction mode is determined to be INTRA in step 302S, alternative coding methods are preferably used (not shown). When the coding prediction mode is determined to be INTER in step 302S, control continues to step 303S. In step 303S, the blocks determined to be in the INTER mode are searched for halfpels (i.e., a motion vector estimation in half pixel units).

In step 303S, a general searching method such as in MPEG-4 video verification model (VM) is applied in the search of the restored prior VOP. When motion vectors of each macroblock are searched down to halfpel units, motion vectors for the 4 8×8 blocks, in a macroblock are searched. The region of search is ±2, which is the search region in the 8×8 search in the advanced mode.

In step 304S, the search is preferably conducted in a restored prior VOP and an initial search is started from a motion vector, either of a 16×16 block, or of a motion vector that has a smaller SAD for the 8×8 block in question among the motion vectors ($MV^i_{bil}$) obtained by a bilinear interpolation of a motion vector($MV_{16}$) of 16×16 block and motion vectors of blocks around the 16×16 block. In this instance, the motion vectors($MV^i_{bil}$) are rounded in halfpel units, and the more the bilinear interpolated motion vectors are selected, an entropy in a motion vector field is increased with an increase of motion vector information. Therefore, to prevent the motion vector information from being increased, an initial motion vector is determined between an SAD from $MV_{16}$ ($SAD^i_{16}$,1<i<4), rather than between an SAD ($SAD^i_{bil}$, 1<i<4) from $MV^i_{bil}$.

If the determination in step 304S is affirmative because $SAD^i_{bil}$<$SAD^i_{16}$–64, control continues to step 304AS. In step 304AS, $MV^i_{bil}$ is selected as the initial motion vector. If the determination in step 304S is negative, control continues to step 304BS. In step 304BS, $MV_{16}$ is selected as the initial vector. From steps 304AS and step 304BS, control continues to step 305S.

In step 305S, it is determined if initial vectors for the remaining 8×8 blocks of the macroblock in question have been determined. If the determination in step 305S is negative, control returns to step 304S to obtain an initial vector for the next 8×8 block. If the determination in step 305S is affirmative, control continues to step 306S.

In step 306S, a local search for each of the initial motion vectors is conducted within a search region of ±2. From step 306S, control continues to step 307S. In step 307S, a ±0.5 halfpel search is conducted to obtain a final motion vector. Upon obtaining the final motion vector, control continues to step 308S.

In step 308S, a sum of the SADs ($SAD_8^i$, 1≤i≤4) of the 4 8×8 blocks and the SAD ($SAD_{16}$) from $MV_{16}$ are compared according to the following equation, where $N_B$ is the number of pixels in the macroblock.

$$\sum_{i=1}^{4} SAD^i_8 < SAD_{16} - (N_B + 1)$$

If the determination in step 308S is affirmative, control continues to step 309S. In. step 309S, the motion is predicted in 8×8 block units using the 4 finally searched 8×8 motion vectors. If the determination in step 308S is negative, control continues to step 310S. In step 310S, the motion is predicted in 16×16 block units. From step 309S and step 310S, the process ends.

As described above, when an 8×8 mode is selected, the preferred embodiment for estimating a motion vector of the present invention has various advantages. The preferred embodiment can reduce the blocking artifact significantly compared to a VM advanced mode because it can make a search proper to macroblock characteristics more effectively than VM by means of a simple or rapidly calculated bilinear interpolation of motion vectors. Further, the preferred embodiment conducts the local search in the restored prior VOP, which is actually used in final motion compensation, rather than in the prior original VOP. In this instance, there is no possibility of being trapped in a local minimum because, although it is not an original image but a restored image, the local search region is relatively small compared to the entire search region.

An exemplary apparatus using a method for estimating a motion vector according to the preferred embodiment of the present invention will now be described. FIG. 4a and 4b illustrate tables of conditions for conducting a method for estimating a motion vector in accordance the preferred embodiment. The estimating conditions include first, a Quantization Parameter (QP) being fixed for each sequence, and motion vectors for all pixels are quantized down to halfpel units using an H.263 quantization table. Second, only Predictive-Video Object Plane (P-VOP) is used in the motion estimation, and Intra-Video Object Plane (I-VOP) is used as an initial VOP. Third, an INTRA AC/DC prediction is used with a deblocking filter turned off.

Results of decoding of the coding under the conditions shown in FIGS. 4a and 4b are illustrated in tables in FIGS. 5a–5c. FIG. 5a shows the case when no deblocking filter is used. FIG. 5b shows the case when a loop filter is used and FIG. 5c shows the case when a post filter is used.

As shown, the results have a rate-distortion almost identical to the case of VM. In other words, no blocking artifact is found in an image decoded in high and low speed applications. Thus, the preferred embodiment according to the present invention can produce an image of which critical resolutions are improved.

A coding process according to the preferred embodiment of a method for estimating a motion vector in a moving picture according to the present invention advantageously reduce computational complexity because, different from MPEG-4 video VM4.0, no OBMC is used. Further, the process according to the preferred embodiment has an advantage of allowing a high adaptability to VM because there is no change in syntax.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for estimating a motion vector in a moving picture, the method comprising the steps of:

estimating motions for luminance components of a plurality of macroblocks;

determining a coding prediction mode when a motion vector is obtained;

searching blocks of which coding prediction mode is determined to be a first mode for halfpels;

selecting an initial motion vector from one of motion vectors obtained by a bilinear interpolation of a macroblock motion vector and motion vectors of blocks adjacent the macroblock;

making a first search of the initial motion vectors of the blocks in a search region when the initial vectors of the blocks are determined; and making second search to obtain final motion vectors and using the final motion vectors to predict one of a motion in block units and a motion in macroblock units, wherein after the final motion vector is obtained, further comprising estimating and compensating the motion vector by comparing a sum of the Summation Absolute Differentials (SADs) ($SAD^i_8, 1 \leq i \leq 4$) from the 4 8×8 blocks, and the SAD ($SAD_{16}$) from $MV_{16}$ and predicting a motion in 16×16 block units unless the motion is predicted in 8×8 block units using the 4 8×8 motion vectors because the comparison satisfies the following condition:

$$\sum_{i=1}^{4} SAD^i_8 < SAD_{16} - (N_B + 1),$$

where $N_B$ is the number of pixels in a macroblock.

2. The method of claim 1, wherein the selected initial motion vector has a smaller Summation Absolute Differential (SAD) to a selected block.

3. The method of claim 1, wherein the search of the initial motion vectors of the blocks is a local search within ±2 search region, and wherein the second search is ±0.5 halfpel search.

4. The method of claim 1, wherein a comparison between the present block and a previous block is used to estimate the motions of luminance components of the plurality of macroblocks.

5. The method of claim 4, wherein the previous block is obtained in a prior original VOP, and wherein the motions of luminance components use integer units.

6. The method of claim 5, wherein the prior original VOP is padded based on a MPEG-4 verification model.

7. The method of claim 1, wherein the estimating motions of luminance components step searches a predetermined region based on an interval of prediction frames.

8. The method of claim 7, wherein the interval of prediction frames satisfies the following condition:

$$SAD_N(x, y) = \sum_{i=1, j=1}^{N,N} ]MV \text{ of a prior } VOP -$$

$$MV \text{ of the present block}] * (! (\text{original } VOP == 0))$$

where, $64 \leq x, y \geq 63$, and $N=16$.

9. The method of claim 8, wherein of an SAD for obtaining a motion vector, $SAD_{16}(0,0)$ is reduced to a predetermined value.

10. The method of claim 1, wherein a coding prediction mode is determined to one of the first mode and a second mode depending on a median of a selectable macroblock and a differential of a matching interval.

11. The method of claim 10, wherein the first mode is an INTER mode and the second mode is an INTRA mode, and wherein the median of a selectable macroblock is determined by the following equation:

$$\text{Median of a macroblock} = \left( \sum_{i=1, j=1}^{N_B} \text{prior } VOP \right) / N_B.$$

12. The method of claim 1, wherein the halfpel search is conducted on a restored prior VOP.

13. The method of claim 1, wherein $MV_{16}$ is selected as the initial motion vector as the initial motion vector unless $MV^i_{bil}$ is selected because $SAD^i_{bil} < SAD^i_{16} - 64$.

14. The method of claim 1, wherein the macroblock is a 16×16 block and the blocks are 8×8 blocks.

15. A method for estimating a motion vector in a moving picture, the method comprising the steps of:

estimating motions of luminance components of a plurality of blocks;

searching blocks when the coding prediction mode for a motion vector is determined to be an INTER mode for halfpels;

selecting a vector having a smaller summation absolute differential (SAD) to a selected sub-block from motion vectors obtained by a bilinear interpolation of a block motion vector and motion vectors of a plurality of sub-blocks around the block as an initial motion vector;

making a first search of the initial motion vectors of the sub-blocks in a search region when the initial vectors of the sub-blocks are determined;

making second search to obtain final motion vectors to predict a motion in one of sub-block units and block units; and estimating and compensating the motion vector by comparing a sum of the SADs from the plurality of sub-blocks and the SAD from the block and predicting a motion of the motion vector in one of sub-block units and block units, wherein the estimating and compensating step predicts the motion of the motion vector in 8×8 subblock units using 4 8×8 sub-block motion vectors when the following equation is satisfied:

$$\sum_{i=1}^{4} SAD^i_8 < SAD_{16} - (N_B + 1),$$

where $N_B$ is the number of pixels in a block.

16. A method for estimating a motion vector in a moving picture, the method comprising the steps of:

estimating motions for luminance components of a plurality of macroblocks;

determining a coding prediction mode when a motion vector is obtained;

searching blocks of which coding prediction mode is determined to be a first mode for halfpels; and selecting an initial motion vector from one of motion vectors obtained by a bilinear interpolation of a macroblock motion vector and motion vectors of blocks adjacent the macroblock, wherein a comparison between the present block and a previous block is used to estimate the motions of luminance components of the plurality of macroblocks, wherein the previous block is obtained in a prior original VOP, wherein the motions of luminance components use integer units, and wherein the prior original VOP is padded based on a MPEG-4 verification model.

17. A method for estimating a motion vector in a moving picture, the method comprising the steps of:

estimating motions for luminance components of a plurality of macroblocks;

determining a coding prediction mode when a motion vector is obtained;

searching blocks of which coding prediction mode is determined to be a first mode for halfpels; and selecting an initial motion vector from one of motion vectors obtained by a bilinear interpolation of a macroblock motion vector and motion vectors of blocks adjacent the macroblock, wherein the estimating motions of luminance components step searches a predetermined region based on an interval of prediction frames, and wherein the interval of prediction frames satisfies the following condition:

$$SAD_N(x, y) = \sum_{i=1,j=1}^{N,N} ]MV \text{ of a prior } VOP - MV \text{ of the present block}] * (!(\text{original } VOP = 0))$$

where, $64 \leq x, y \geq 63$, and $N=16$.

18. The method of claim 17, wherein for obtaining a motion vector, $SAD_{16}(0,0)$ is reduced to a predetermined value.

19. A method for estimating a motion vector in a moving picture, the method comprising the steps of:
estimating motions for luminance components of a plurality of macroblocks;
determining a coding prediction mode when a motion vector is obtained;
searching blocks of which coding prediction mode is determined to be a first mode for halfpels; and
selecting an initial motion vector from one of motion vectors obtained by a bilinear interpolation of a macroblock motion vector and motion vectors of blocks adjacent the macroblock, wherein a coding prediction mode is determined to one of the first mode and a second mode depending on a median of a selectable macroblock and a differential of a matching interval, and wherein the first mode is an INTER mode and the second mode is an INTRA mode, and wherein the median of a selectable macroblock is determined by the following equation:

$$\text{Median of a macroblock} = \left( \sum_{i=1,j=1}^{N_B} \text{prior } VOP \right) \bigg/ N_B.$$

20. A method for estimating a motion vector in a moving picture, the method comprising the steps of:
estimating motions for luminance components of a plurality of macroblocks;
determining a coding prediction mode when a motion vector is obtained;
searching blocks of which coding prediction mode is determined to be a first mode for halfpels; and
selecting an initial motion vector from one of motion vectors obtained by a bilinear interpolation of a macroblock motion vector and motion vectors of blocks adjacent the macroblock, wherein $MV_{16}$ is selected as the initial motion vector unless $MV^i_{bil}$ is selected as the initial motion vector because $SAD^i_{bil} < SAD^i_{16} - 64$.

* * * * *